June 15, 1965   P. MORRILL   3,188,762
EMBELLISHED PHOTO-MOUNTS
Filed March 1, 1962

INVENTOR
Philip Morrill

BY
ATTORNEY

United States Patent Office 3,188,762
Patented June 15, 1965

3,188,762
EMBELLISHED PHOTO-MOUNTS
Philip Morrill, Baltimore, Md.
(704 Marumsco Drive, Woodbridge, Va.)
Filed Mar. 1, 1962, Ser. No. 176,548
4 Claims. (Cl. 40—158)

This invention relates to photo-mounts or slides used with optical projecting apparatus, and more particularly to one with an imprinted ornamental supplement adapted to be incorporated in the picture projected. The purpose being to improve the aesthetic appearance of such picture on a screen surface.

A number of photo-mounts of different designs have been developed and made commercially available. The conventional kind includes a photograph or picture on a plastic film or glass. It is sandwiched between a pair of thin boards, having a central area open for the light to be projected through the picture. The picture appears on the screen, plain and without a border. The picture so presented impresses the observer, as aesthetically incomplete. To overcome this, this invention supplies the deficiency by including a pictorial frame about the picture proper as it is shone on the screen surface.

This is an embellishment to the picture that may be employed in different ways. Thus it can be included with the picture itself, or as an entirely different supplement made more or less stationary while the picture itself is changed. The resulting effect on the observer is more agreeable, whichever way it is used.

The main object of the invention is to frame-in the picture shown on a screen by a projector using a photo-mount. While the use of conventional plastic film is preferable, it is also intended to include glass slides, where such are more convenient or desirable.

Another object of the invention is to provide a new and improved photo-mount that will include an ornamental photo-mount supplement adapted to frame-in a picture presented by a projector on a screen.

A further object of this invention is to provide a new and improved photo-mount with a frame visually indicated about a picture transmitted through it, on a screen surface.

An additional object of the invention, is to provide a new and improved photo-mount that can be readily assembled and include an arrangement that will permit the incorporation of more than one pictorial presentations to be projected at the same time on a screen surface.

Other objects will become apparent as the invention is more fully outlined.

To accomplish these objects, a photo-mount is so designed and constructed, that it will combine, a picture of conventional type on a film, with another film having an ornamental frame represented on it, and include a sandwich boarding of thin sheets of material of opaque nature. The sheets are made with central windows to permit the light of a projector to pass therethrough to the screen, after passing through the pictures on the films.

For a better understanding of the invention, its objects, principles and operation, reference is made to the accompanying drawings, whereon a preferred form of the invention is indicated by way of example. These drawings are explained in the description that follows, while the appended claims indicate the scope of the invention.

In the drawings.

Similar numbers throughout the drawings pertain to the same parts.

Figure 1:
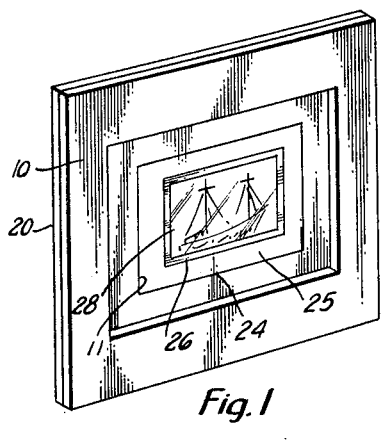
FIG. 1 is a view in perspective of an assembled photo-mount embodying this invention.
Figure 3:
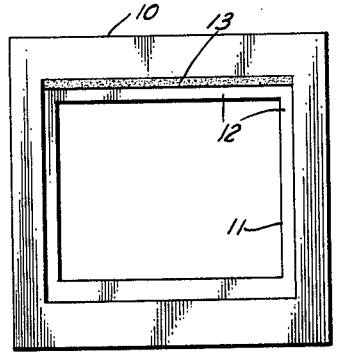
FIG. 3 is an inside view in elevation of the backings employed to sandwich the picture films in the assembled photo-mount.
Figure 2:
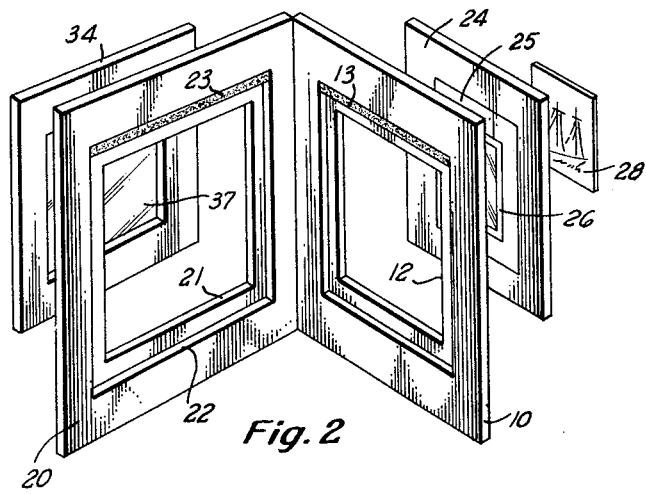
FIG. 2 is a view in perspective in the unassembled parts of the photo-mount indicated in FIG. 1.
Figure 4:
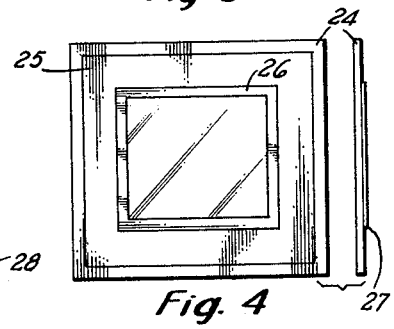
FIG. 4 is a view in elevation of a film insert, front and side, with an ornamental supplement imprinted on its face, which is registered to form a frame-like picture within the perimeter of the central opening.
Figure 5:
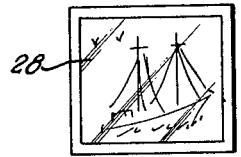
FIG. 5 is a view in elevation of the picture film applied to its respective insert within its supplement.

The photo-mount consists of a pair of backings, 10 and 20. They are termed, front and rear, respectively to distinguish them from each other. They may be joined in hinge-like manner or separated. They are made symmetrical and of a size to suit the projector in which their assembly is used.

The backing 10, has a large central opening 11, with the peripheral edge portion recessed or stepped as indicated at 12. The upper and lower portions of the step are made wider than the sides. The upper portion of the step is partially covered with a strip of Scotch tape, tacky on both sides. Other portions could be similarly treated, but such is not necessary in most instances. It is designated at 13.

The backing 20, likewise has a central opening 21, and the peripheral step 22. The tacky strip is shown at 23.

A film insert 24, is cut to a size that will enable it to fit conveniently in the rectangular step portion 12 of the backing 10. It is so placed that it will be on the inside of the assembly. When it is fitted in place, the insert will adhere to the strip 13. Its ornamental imprint or supplement 25 is designed to register with the peripheral line of the opening 11. In this position, the imprint will indicate the outline of a frame of predetermined dimensions. This imprint has an opaque strip 26 (or border) and which forms a relatively wide border along the inner line of the imprint 25. The imprint 25 is translucent, so the light from a projector will pass through and depict its design on the screen.

Figure 7:
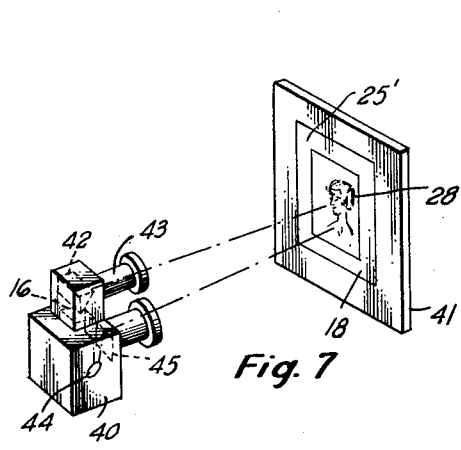
FIG. 7 is a view in diagrammatic perspective of the projector and screen employed with the photo-mount.
Figures 6, 8:
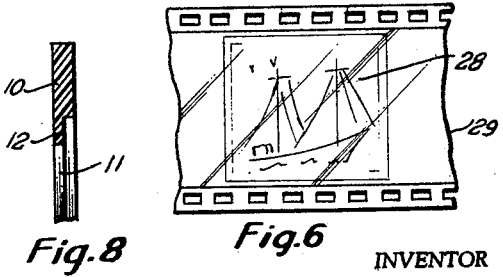
FIG. 6 is a view in elevation showing how a picture may be cut out of a conventional film strip (in dotted outline) to apply to film indicated in FIG. 5.
FIG. 8 is a sectional elevation of a portion of a backing indicating its recessed construction, or step around the opening.

The picture, that is the primary design to be shown on the screen, may be cut from a piece of film 29, as shown at 28, in FIG. 7. This picture 28 is applied to the film insert with a suitable plastic cement, not indicated, and registers with the border 26. The latter covers up any irregularities. The pan 27 punched down into the insert 24 holds the picture aligned in position, and facilitates assembly. It hides any flaws existing along the edges of the picture cut-out 28. This enables the supplement or imprint 25 to frame-in the picture 28, neatly and fully.

Another insert 34, is adapted to fit along the step or ledge 22, of the backing 20, and adhere there to the tacky strip 23, as in the other backing. This insert can be transparent, and simply serve as a protective window for the photo-mount. It has a pan 37, also.

When the inserts are in place, the backings are placed against each other, and fastened together in any conventional manner. This could include the use of a cement, staples or indents. This completes the assembly of the photo-mount.

In the use of the photo-mount, the latter is inserted in a slide projector 40. The light from the projector 40, passes through the photo-mount and its imprint 25, encompassing the picture 28' are shown on the screen surface 41. The picture, instead of being plain and unfinished around its periphery, is enclosed in an attractive frame 25'. The screen picture 28' is thus framed-in and looks more aesthetic than a plain one.

In some instances, where the older type of photo-mounts are to be used, the picture is already sandwiched in its backings, and cannot be framed-in. In such a case, the photo-mount of this invention is assembled without the picture. This leaves the ornamental imprint to be used alone. This can be accomplished by the employment of a prism 42 and an adjustable lens tube 43. The light 44 is then projected through the old photo-mount 45 and the new type 16. The picture 28' on the screen is projected with the imprint 25' surrounding it, from the independent lens tube 43. The latter picture can be left stationary, while the older photo-mounts are changed consecutively. This will bring the latter up-to-date with a frame about the screen picture.

The backings may be of cardboard, plastic, metal or other suitable material. In case of metals, welding is feasible as a means for fastening any of the parts that require it. When fastened together the backings retain the inserts and picture in place and protected against mechanical damage, drying out and shrinking.

The assembly of the parts is greatly facilitated by their construction. The inserted windows or film slip in position readily and the picture cut-out readily drops into the pan and aligns itself. It will not become displaced, because the sides of the pan maintain it rigidly.

The effect of the ornamental imprint is beneficial, both to the appearance of the picture transmitted on to the screen surface and the observer. It is not only restful but gives depth to the picture transmitted. The border eliminates any possibility of raggedness and roughness along the edges of the picture, and the cost involved is satisfactory.

While but one form of the invention is disclosed in this application for Letters Patent, it is not desired to limit the invention to this particular construction, as it is appreciated that other structures could be designed and developed that would employ the same principles and come within the scope of the appended claims.

Having thus described the invention what is claimed is:

1. A photo-mount assembly comprising, a pair of symmetrical backings of opaque material and relatively thin, adapted to fasten to each other; each of said backings including a window opening in its central area, and one having a step formed along the peripheral edge portion of its opening; a translucent insert placeable and fitting on said step and across the opening and including a frame-like imprint thereon inside the opening area, and a recessed indent surrounded thereby; a picture cut-out insertable in the indent and surrounded by said imprint; means for fastening the backings together whereby the light from a projector in which the assembly is placed will be transmitted to a screen surface showing the picture encompassed by said imprint.

2. A photo-mount unit comprising; a plurality of backings including a window opening in the central area of each having a recessed step portion along the peripheral edge portion; a plurality of inserts adapted to fit and rest on said step portions; said inserts having an indented pan formed thereon in each; a picture cut-out adapted to fit in one of said pan and align with said openings; so that the light from a projector in which the unit is used will be projected on a screen surface; and a translucent supplement imprinted on one of the inserts for adding a frame-like representation around the said projected light; and means for fastening the backings together into a single assembly.

3. A photo-mount unit comprising, a pair of relatively thin backings of symmetrical form including a window opening in each disposed in alignment together; said opening having a recessed step formation along the peripheral portion; an insert of translucent material sized to fit in said opening and rest on said formation of one of the backings, with a pan indented therein; a picture cut-out adapted to fit into said pan and be held therein and in alignment with said opening, so that the placement of the unit in a projector will cause the light thereof to transmit the picture of said cut-out on to an exteriorly located screen surface; an imprint on the insert around the periphery of the pan, adapted to be transmitted also by the projector and frame-in the said picture; means for attaching the insert to backing it is rested on, and another means for fastening the backings together with the insert sandwiched between them.

4. The same as claim 3, adding: and another window insert rested on the other backing formation and translucent, sandwiched likewise and forming a protective pane in front of first mentioned insert and cut-out.

References Cited by the Examiner

UNITED STATES PATENTS

| | | | |
|---|---|---|---|
| 1,361,274 | 12/20 | Miedrich | 88—26 |
| 1,467,108 | 9/23 | Hodgson | 40—158 |
| 1,477,131 | 12/23 | Kulik | 40—158 |
| 2,291,173 | 7/42 | Simpson | 40—158 |

FOREIGN PATENTS

| | | |
|---|---|---|
| 490,181 | 12/18 | France. |
| 1,361,274 | 12/20 | Great Britain. |

JEROME SCHNALL, *Primary Examiner.*

E. V. BENHAM, *Examiner.*